Oct. 13, 1942.    J. E. LYLE    2,298,537
SQUADRON HITCH
Filed March 3, 1941
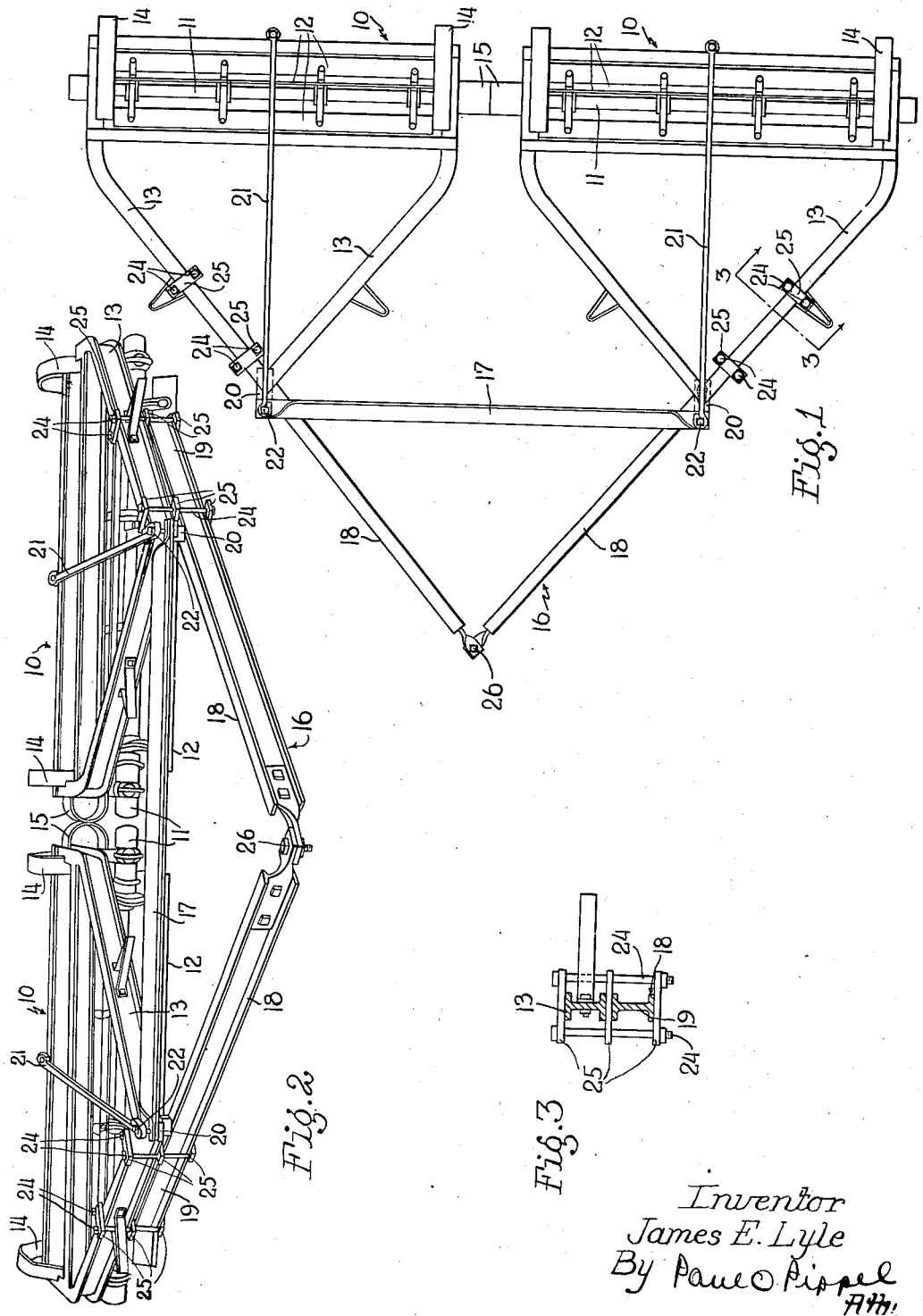
Inventor
James E. Lyle
By Paul O. Pippel
Att'y.

Patented Oct. 13, 1942

2,298,537

UNITED STATES PATENT OFFICE 2,298,537

SQUADRON HITCH

James E. Lyle, Canton, Ill., assignor to International Harvester Company, a corporation of New Jersey Application March 3, 1941, Serial No. 381,479

4 Claims. (Cl. 55—61)

This invention relates to the connection of a plurality of tools in squadron formation. More specifically it relates to a squadron-type stalk cutter.

Stalk cutters are known which comprise the usual shaft with stalk cutting elements connected therewith and a hitch frame extending forwardly from the shaft and cutting elements and serving as a connection to a source of draft power such as a tractor. It sometimes becomes desirable to provide a stalk cutter of increased width. This may be done by the connection of two ordinary stalk cutters in end-to-end relation, and the present invention relates to such a construction.

An object of the present invention is to provide an improved stalk cutter.

A further object is to provide a stalk cutter formed of two stalk cutters connected end-to-end.

Another object is to provide an improved draft frame for a stalk cutter.

According to the present invention, two stalk cutters are provided with triangular draft frames and are positioned in end-to-end abutting relation. Another triangular draft frame is provided and connected to the first draft frame with its base extending between the apices of the other draft frames, and extensions of the sides beyond the base are secured in overlapping relationship to the sides of the first draft frame. The apex of the last-mentioned draft frame provides a point of connection for the squadron-type stalk cutter thus formed with a draft means such as a tractor.

In the drawing:

Figure 1 is a plan view of the improved stalk cutter of the present invention;

Figure 2 is a perspective view thereof; and,

Figure 3 is a sectional view taken along the lines 3—3 of Figure 1.

The reference character 10 designates like stalk-cutter units positioned in side-by-side relationship, and each provided with a shaft 11, blades 12 spaced about the shaft 11 and extending the length thereof, and a triangular draft frame 13. The ends of the units are provided with runner members 14 which serve to support the units in inverted position for transport with the blades clear of the ground. As seen in Figure 2, the inner ends of the units are provided with bumper members 15 of U-shape which abut one another and keep the ends of the shafts 11 out of engagement. The units 10 are connected to one another by means of a triangular framework 16 composed of a base formed of an angle member 17 and sides 18 formed of I-beams and having extensions 19 beyond the base 17. Parts 20 are secured to the under side of the apices of the triangular framework 13 forming parts of the stalk-cutter units, and reenforcing members 21 are secured to the top side of the apices as well as at the rear of the stalk cutters for reenforcement thereof. The ends of the member 17 extend between the parts 20 and 21 and are secured there by bolts 22 which extend through the parts 20 and 21 and the ends of the base member 17. The extensions 19 of the side members 18 of the triangular framework 16 extend beneath the triangular framework 13 and in overlapping relationship with the sides thereof. The extensions are clamped to the sides by means of bolts 24 which extend through clamping pieces 25. At best shown in Figure 3, the bolts 24 are on opposite sides of the parts which they clamp together and extend through three clamping plates which are on top of, in between, and on the bottom of the parts. The ends of the side members 18 are connected to one another by means of a bolt 26 to form the apex at the framework 16. The bolt also serves as a means of connection for the stalk cutter with a source of draft power such as a tractor, not shown.

The operation of a stalk cutter is well known and need not be described in detail. A source of draft power acting through the bolt 26 pulls the stalk cutter over the ground. The units 10 are in end-to-end relationship with the bumper parts 15 abutting. They are held in this relationship by means of the triangular framework 16 which is secured to the triangular framework 13 forming parts of the units.

It will be apparent from the foregoing description that a new and novel construction has been provided. This construction involves a stalk cutter formed of two stalk cutters placed in end-to-end relationship with their ends abutting and joined to one another by means of a framework which is attached to the framework forming part of said stalk cutter units themselves.

The intention is to limit the invention only within the terms of the appended claims.

What is claimed is:

1. In combination, a pair of stalk-cutter units positioned in end-to-end relation and having bumper portions at their adjacent ends abutting one another, each unit including a triangular draft frame, and a third triangular draft frame having overlapping extending portions secured to the outer sides of the first two draft frames of the stalk-cutter units and providing a point of connection for a tractor.

2. In combination, a pair stalk-cutter units positioned in end-to-end relation and having bumper portions at their adjacent ends abutting one another, each unit including a forwardly extending triangular draft frame, and a third draft frame having rear angular extensions respectively secured to the sides of the triangular draft frames in overlapping relation to secure the units against transverse movement with respect to one another and providing a point of connection for a tractor.

3. In combination, a pair of stalk-cutter units positioned in end-to-end relation and having bumper portions at their adjacent ends abutting one another, each unit including a forwardly extending triangular draft frame, and a third triangular draft frame having extensions at two corners secured to the sides of the first two triangular draft frames in overlapping relation with the sides and an apex serving as a point of connection for a tractor.

4. In combination, a pair of ground-working units positioned in end-to-end relation and having bumper portions at their adjacent ends abutting one another, each unit including a forwardly extending triangular draft frame, and a third triangular draft frame having extensions at two corners secured to the sides of the first two triangular draft frames in overlapping relation with the sides and an apex serving as a point of connection for a tractor.

JAMES E. LYLE.